US 9,232,458 B2

(12) United States Patent
Vasseur et al.

(10) Patent No.: US 9,232,458 B2
(45) Date of Patent: Jan. 5, 2016

(54) PROACTIVE TIMER-BASED LOCAL REPAIR PATH COMMUNICATION IN REACTIVE ROUTING NETWORKS

(75) Inventors: Jean-Philippe Vasseur, Saint Martin d'Uriage (FR); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 439 days.

(21) Appl. No.: 13/566,027

(22) Filed: Aug. 3, 2012

(65) Prior Publication Data
US 2013/0250754 A1 Sep. 26, 2013

Related U.S. Application Data

(60) Provisional application No. 61/614,703, filed on Mar. 23, 2012.

(51) Int. Cl.
| | |
|---|---|
| *H04W 40/02* | (2009.01) |
| *H04W 40/28* | (2009.01) |
| *H04W 40/20* | (2009.01) |
| *H04L 12/721* | (2013.01) |
| *H04L 12/715* | (2013.01) |

(52) U.S. Cl.
CPC ............ *H04W 40/023* (2013.01); *H04W 40/28* (2013.01); *H04L 45/32* (2013.01); *H04L 45/46* (2013.01); *H04W 40/20* (2013.01)

(58) Field of Classification Search
CPC ......... H04L 45/48; H04L 45/02; H04L 45/22; H04L 41/12; H04W 40/26; H04W 84/18
See application file for complete search history.

(56) References Cited

U.S. PATENT DOCUMENTS

| | | | |
|---|---|---|---|
| 6,132,306 | A | 10/2000 | Trompower |
| 6,732,163 | B1 | 5/2004 | Halasz |
| 6,961,323 | B1 | 11/2005 | Xu et al. |
| 7,177,295 | B1 | 2/2007 | Sholander et al. |
| 7,385,988 | B2 | 6/2008 | Asati |
| 7,398,310 | B1 | 7/2008 | Kuehl et al. |
| 7,424,268 | B2 | 9/2008 | Diener et al. |

(Continued)

FOREIGN PATENT DOCUMENTS

| | | |
|---|---|---|
| EP | 2548342 A1 | 1/2013 |
| WO | WO-2011115679 A1 | 9/2011 |

OTHER PUBLICATIONS

Clausen, et al., "The LLN On-demand Ad hoc Distance-vector Routing Protocol—Next Generation (LOADng)", IETF Trust, Network Working Group, Internet Draft, draft-clausen-lln-loadng-02, Mar. 2012, 44 pages.

(Continued)

*Primary Examiner* — Jung Park
(74) *Attorney, Agent, or Firm* — Parker Ibrahim & Berg LLC; James M. Behmke; Stephen D. LeBarron (57) ABSTRACT

In one embodiment, an intermediate device may determine a source route in use from a source to a destination in a reactive routing computer network, and may also determine a request to provide local repair for the source route for duration of a timer set by the source. In response to the request (e.g., and in response to a poor/failed connection), the device may discover a local repair path based on a limited-scope discovery, and maintains the local repair path for the source route until expiration of the timer.

20 Claims, 10 Drawing Sheets

(56) References Cited

U.S. PATENT DOCUMENTS

| | | | |
|---|---|---|---|
| 7,515,542 | B2 | 4/2009 | Hertoghs et al. |
| 7,542,414 | B1 | 6/2009 | Katukam |
| 7,606,335 | B2 | 10/2009 | Kloper et al. |
| 7,634,536 | B2 | 12/2009 | Halasz |
| 7,684,411 | B2 | 3/2010 | Asati |
| 7,729,290 | B2 | 6/2010 | Saleh et al. |
| 7,787,361 | B2 | 8/2010 | Rahman et al. |
| 7,826,454 | B2 | 11/2010 | Polk et al. |
| 7,826,463 | B2 | 11/2010 | Patel et al. |
| 7,826,560 | B2 | 11/2010 | Raleigh et al. |
| 7,840,217 | B2 | 11/2010 | Patel et al. |
| 7,848,224 | B2 | 12/2010 | Bryant et al. |
| 7,869,350 | B1 | 1/2011 | Bryant et al. |
| 7,899,027 | B2 | 3/2011 | Castagnoli et al. |
| 7,965,642 | B2 | 6/2011 | Shand et al. |
| 7,978,725 | B2 | 7/2011 | Gong et al. |
| 7,983,174 | B1 | 7/2011 | Monaghan et al. |
| 8,068,411 | B2 | 11/2011 | Vasseur et al. |
| 8,068,840 | B2 | 11/2011 | Patel et al. |
| 8,125,911 | B2 | 2/2012 | Patel et al. |
| 8,179,801 | B2 | 5/2012 | Previdi et al. |
| 8,308,509 | B2 | 11/2012 | Karam |
| 8,355,380 | B1 * | 1/2013 | Banerjea ................... 370/331 |
| 8,363,662 | B2 | 1/2013 | Thubert et al. |
| 8,374,092 | B2 | 2/2013 | Previdi et al. |
| 8,374,164 | B2 | 2/2013 | Nadeau et al. |
| 8,392,541 | B2 | 3/2013 | Agarwal et al. |
| 2003/0204623 | A1 | 10/2003 | Cain |
| 2006/0072602 | A1 | 4/2006 | Achanta |
| 2006/0215583 | A1 | 9/2006 | Castagnoli |
| 2007/0206547 | A1 | 9/2007 | Gong et al. |
| 2011/0228696 | A1 * | 9/2011 | Agarwal et al. .......... 370/253 |
| 2011/0231573 | A1 | 9/2011 | Vasseur et al. |
| 2012/0039186 | A1 * | 2/2012 | Vasseur ..................... 370/248 |

OTHER PUBLICATIONS

Clausen, et al., "The LLN On-demand Ad hoc Distance-vector Routing Protocol—Next Generation (LOADng)", IETF Trust, Network Working Group, Internet Draft, draft-clausen-lln-loadng-04, Apr. 2012, 50 pages.

Li, et al., "On-Demand Node-Disjoint Multipath Routing in Wireless Ad Hoc Networks", Proceedings of the 29th Annual IEEE International Conference on Local Computer Networks (LCN '04), Tampa, Florida, Nov. 2004, 2 pages.

Sambasivam, et al., "Dynamically Adaptive Multipath Routing Based on AODV", Proceedings of the 3rd Annual Mediterranean Ad hoc Networking Workshop (MedHocNet), Bodrum, Turkey, Jun. 2004, 12 pages.

Sarma, et al., "A Multipath QoS Routing with Route Stability for Mobile Ad Hoc Networks", IETE Technical Review, vol. 27, No. 5, pp. 380-397, Sep. 2010.

Winter, et al., "RPL: IPv6 Routing Protocol for Low Power and Lossy Networks", draft-ietf-roll-rpl-19, IETF Internet-Draft; Mar. 2011, 164 pages.

Finnie, et al., "Notification of Transmittal of the International Search Report and the Written Opinion of the International Searching Authority, or the Declaration", Patent Cooperation Treaty, International Appl. No. PCT/US2013/033470, mailed Jun. 25, 2013, 12 pages, European Patent Office, Rijswijk, Netherlands.

Haas, et al., "The Zone Routing Protocol (ZRP) for Ad Hoc Networks", Internet Draft, draft-ietf-manet-zone-zrp-03.txt, Mar. 2000, 48 pages, The Internet Engineering Task Force Trust.

Kum, et al., "An Efficient On-Demand Routing Approach with Directional Flooding for Wireless Mesh Networks", Journal of Communications and Networks, vol. 12, No. 1, Feb. 2010, pp. 67-73, Seoul, Korea.

Li, et al., "ABRP: Anchor-Based Routing Protocol for Mobile Ad Hoc Networks", Wireless Personal Communications, vol. 42, No. 2, Aug. 16, 2006, pp. 277-300, Kluwer Academic Publishers.

Ochi, et al., "An Extended AODV Routing for Reduction of Control Messages in Ad Hoc Networks", Consumer Communications and Networking Conference, Jan. 2007, 5 pages, Institute of Electrical and Electronics Engineers.

Pozzi, et al., "Notification of Transmittal of the International Search Report and the Written Opinion of the International Searching Authority, or the Declaration", Patent Cooperation Treaty, International Appl. No. PCT/US2013/033478, mailed Jun. 26, 2013, 12 pages, European Patent Office, Rijswijk, Netherlands.

Singh, et al., "Enhanced AODV Routing Protocol with paging in Heterogeneous IP-Based Networks", Wireless Communications and Networking Conference, Apr. 18, 2010, 6 pages, Institute of Electrical and Electronics Engineers, Piscataway, NJ.

Sucec, et al., "A Query Scope Agent for Flood Search Routing Protocols", Wireless Networks, The Journal of Mobile Communication, vol. 9, No. 6, Nov. 2003, pp. 623-636, Kluwer Academic Publishers, The Netherlands.

Clausen, et al., "The LLN On-demand Ad hoc Distance-vector Routing Protocol—Next Generation (LOADng)", IETF Trust, Network Working Group, Internet Draft, draft-clausen-lln-loadng-05, Jul. 2012, 57 pages.

Vasseur, et al., "Techniques for Use in Reactive Routing Networks", U.S. Appl. No. 61/614,703, filed Mar. 23, 2012, 64 pages.

Winter; et al., "RPL: IPv6 Routing Protocol for Low-Power and Lossy Networks", Internet Engineering Task Force, Request for Comments 6550, Mar. 2012, 158 pages.

* cited by examiner

PROACTIVE TIMER-BASED LOCAL REPAIR PATH COMMUNICATION IN REACTIVE ROUTING NETWORKS

RELATED APPLICATION

The present application claims priority to U.S. Provisional Patent Application Ser. No. 61/614,703, filed Mar. 23, 2012, entitled TECHNIQUES FOR USE IN REACTIVE ROUTING NETWORKS, by Vasseur, et al., the contents of which are hereby incorporated by reference.

TECHNICAL FIELD

The present disclosure relates generally to communication networks, and, more particularly, to reactive routing in communication networks.

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. Routing in LLNs is undoubtedly one of the most critical challenges and a core component of the overall networking solution. Two fundamentally and radically different approaches, each with certain advantages and drawbacks, have been envisioned for routing in LLN/ad-hoc networks known as:

1) Proactive routing: routing topologies are pre-computed by the control plane (e.g., IS-IS, OSPF, RIP, and RPL are proactive routing protocols); and 2) Reactive routing: routes are computed on-the-fly and on-demand by a node that sends a discovery probes throughout the network (e.g., AODV, DYMO, and LOAD are reactive routing protocols).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an intermediate device may determine a source route in use from a source to a destination in a reactive routing computer network, and may also determine a request to provide local repair for the source route for duration of a timer set by the source. In response to the request (e.g., and in response to a poor/failed connection), the device may discover a local repair path based on a limited-scope discovery, and maintains the local repair path for the source route until expiration of the timer.

According to one or more additional embodiments of the disclosure, a source may determine a timer after the expiration of which discovered routes are flushed to cause new route discovery in a reactive routing computer network, and transmits a route discovery probe into the computer network, the probe having an explicit indication of the timer. The source may then select a discovered route based on the route discovery probe, and transmits traffic on the selected discovered route as a source route, the traffic carrying an explicit indication that the source route requests local repair for the source route for duration of the timer.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

Figure 1:
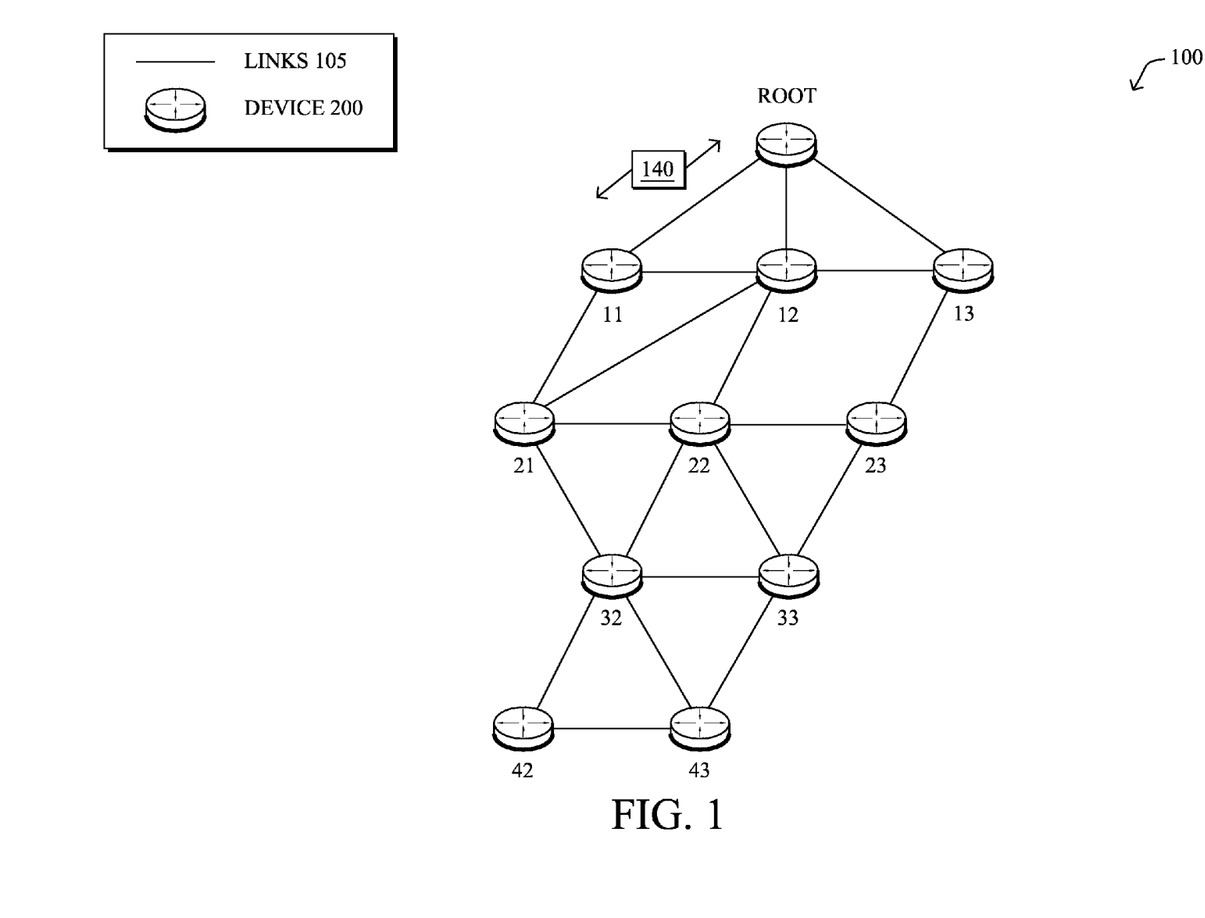
FIG. 1 illustrates an example communication network.

FIG. 1 is a schematic block diagram of an example computer network 100 illustratively comprising nodes/devices 200 (e.g., labeled as shown, "root," "11," "12," ... "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
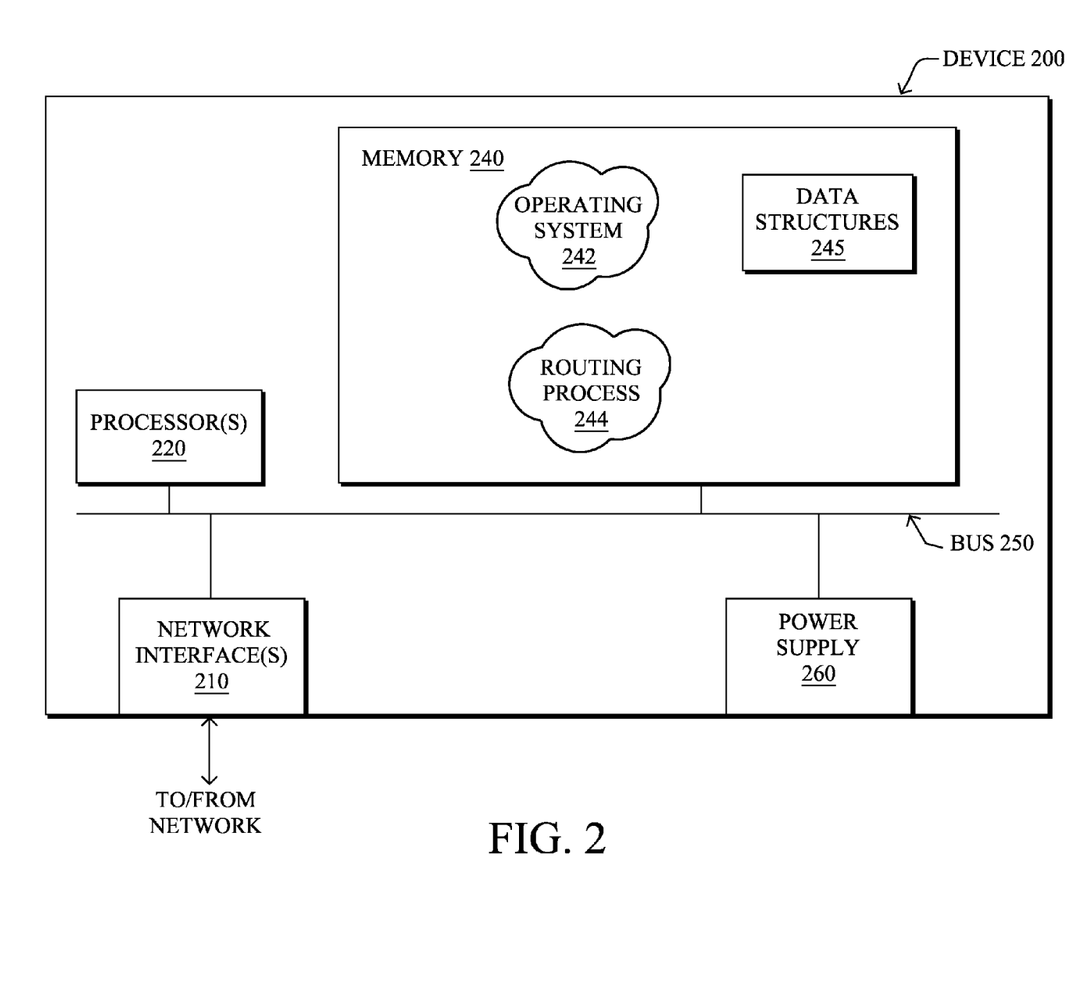
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative routing process 244, as described herein. Note that while the routing process 244 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

As noted above, routing in LLNs is undoubtedly one of the most critical challenges and a core component of the overall networking solution. Two fundamentally and radically different approaches have been envisioned for routing in LLN/ad-hoc networks known as proactive routing (routing topologies are pre-computed by the control plane) and reactive routing (routes are computed on-the-fly and on-demand by a node that sends a discovery probes throughout the network).

An example proactive routing protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) or Destination Oriented Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

An example reactive routing protocol is specified in an IETF Internet Draft, entitled "LLN On-demand Ad hoc Distance-vector Routing Protocol—Next Generation (LOADng)" <draft-clausen-lln-loadng-05> by Clausen, et al. (Jul. 14, 2012 version), provides a reactive routing protocol for LLNs, e.g., as derived from AODV. Other reactive routing protocol efforts include the G3-PLC specification approved by the ITU, and also one described in an informative annex of IEEE P1901.2.

One stated benefit of reactive routing protocols is that their state and communication overhead scales with the number of active sources and destinations in the network. Such protocols only initiate control traffic and establish state when a route to a destination is unknown. In contrast, proactive routing protocols build and maintain routes to all destinations before data packets arrive and incur state and communication overhead that scales with the number of nodes, rather than the number of active sources and destinations. Some believe that reactive routing protocols are well-suited for certain Smart Grid Automated Meter Reading (AMR) applications where a Collection Engine reads each meter one-by-one in round-robin fashion. In such simplistic applications, only one source-destination pair is required at any point in time.

Reactive routing protocols, however, have a number of technical issues that are particularly exhibited in large-scale LLNs, such as large utility networks. It is thus important to have a robust solution for reactive routing. Therefore, various techniques are hereinafter shown and described for use with reactive routing networks to address such shortcomings.

Illustratively, the techniques described herein may be performed by hardware, software, and/or firmware, such as in accordance with the routing process 244, which may contain computer executable instructions executed by the processor 220 (or independent processor of interfaces 210) to perform functions relating to the novel techniques described herein. For example, the techniques herein may be treated as extensions to conventional routing protocols, such as the various reactive routing protocols, and as such, may be processed by similar components understood in the art that execute those protocols, accordingly.

Proactive Timer-Based Local Repair Path Communication

Reactive routing inherently relies on flooding the whole network with probes to reach the destination of a path. Several techniques have been developed to mitigate the negative effects of flooding by reducing/trying to limit the number of broadcast packets generated by the broadcast storm. Such techniques illustratively consist of limiting the flooding scope, number of duplicated probes (for example using multicast trickle), etc. That being said, "flooding" the network is generally required for any reactive routing protocol to make sure that at least N probes reach the destination. Note that although N may be small in "classic" networks with a high delivery rate, N is likely higher in LLNs where the Path Delivery Ratio (PDR) is usually low.

This leads to a delicate trade-off between storing state and increasing the network load due to flooded probes in the network. Storing more state allows to reduce the number of times the discovery process is triggered (and thus the control plane overhead) at the cost of requiring more memory to store routing entries on each originator, knowing that routes are not limited to the best next hops but usually full end-to-end paths from the node to the destination.

Unfortunately, another dimension comes into play: storing routes for a large set of destinations for a longer time so as to reduce flooding significantly increases to probability of using stale routes. When a node sends makes use of a stale route, an error is generated that itself triggers probe flooding, which thus increases the number of probes and cost of the control plane but also incur more delays since a new path must be calculated before resending the packet to its destination.

The techniques herein thus address a well-known issue of reactive routing related to the tension between flooding/state maintenance and the use of stale routes. In particular, the techniques herein may significantly reduce the probability of using stale routes discovered toward unstable paths, without adopting a brute force approach consisting of systematically rediscovering routes in the network, which would be not viable.

Specifically, according to one or more embodiments of the disclosure as described in detail below, intermediate nodes along the path of a reactive route are made aware of the period of time during which that route (if confirmed as active) will be used, and then consequently proactively trigger a local repair path search to dynamically find a local repair path used to reroute packets that would otherwise be dropped because of the path failure (and would have triggered a global search). In addition, the intermediate node may optionally report the path cost increase due to the local repair path to the source that can in turn decide to make use of a different previously discovered route or trigger a new path discovery.

Figure 3A:
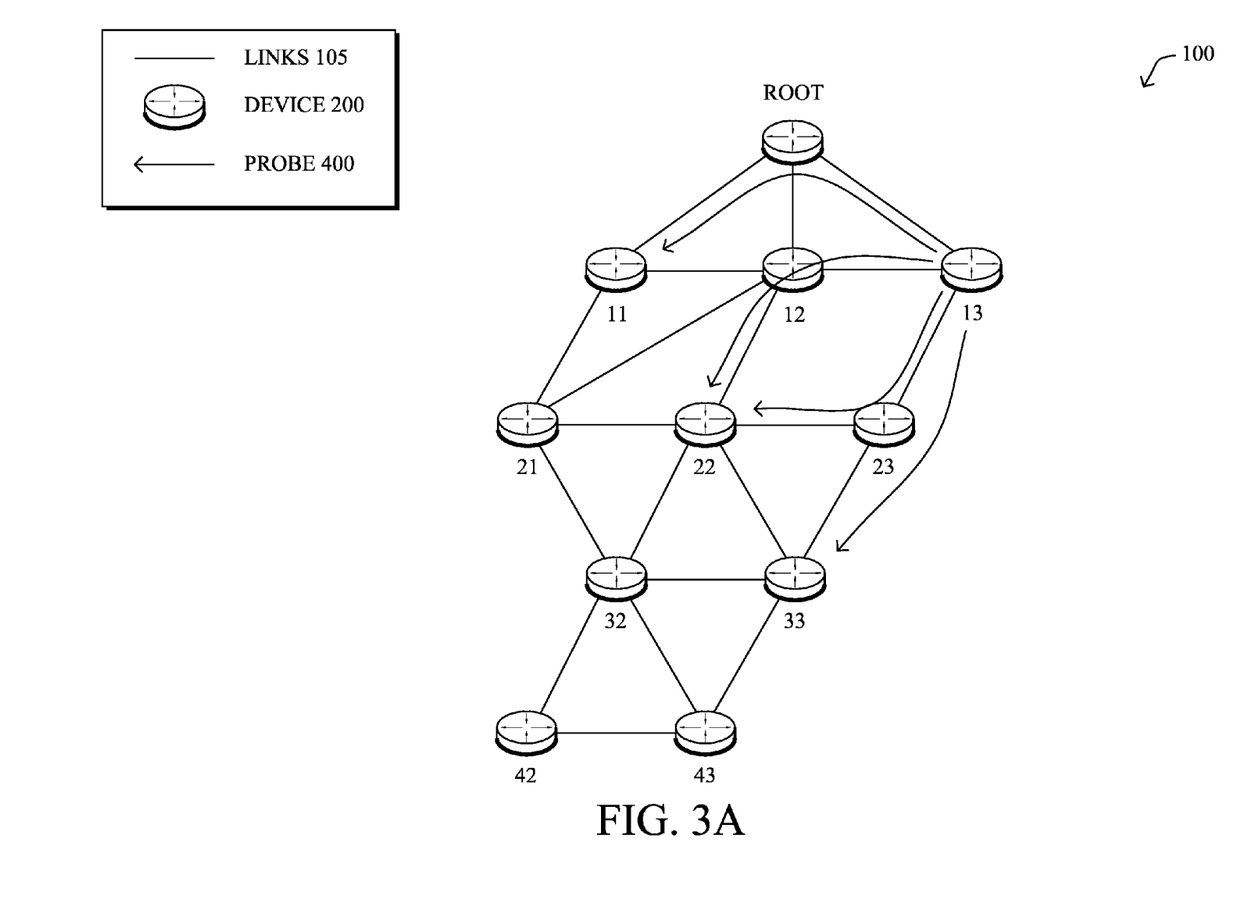
FIGS. 3A-3B illustrate an example of a reactive routing probe messages.

With existing solutions, probes are flooded across the network until a subset of them reach the destination for which the requestor requires a route. Assume the example as shown in FIG. 3A, where node 13 sends probes 400 across the network to find a route to node 43. There are multiple approaches that can be taken:

1) Node 43 returns all of the received probes to node 13 with the recorded path, and path selection is performed by node 13 based of the path cost;

2) Node 43 only arms a timer upon receiving the first probe from node 13 after the expiration of which it selects the received probe with the "best" path according to the path cost; and 3) Node 43 immediately returns the first received probe to node 13 (to avoid wasting time before data packet can be sent), stores the path cost for that probe and only returns further probes if the path is better by X %.

Figure 3B:
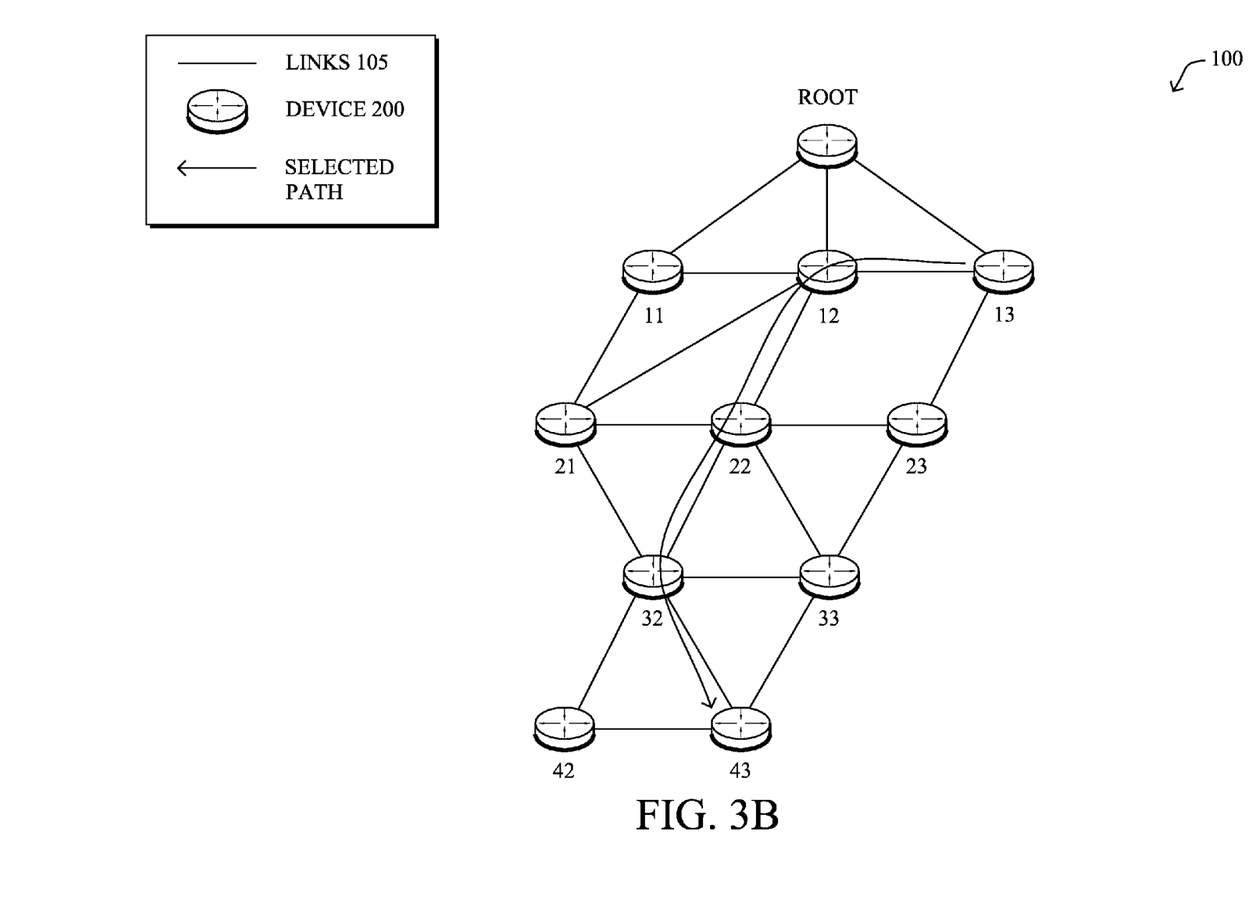

Once a route is discovered between a node 13 (source/requestor) and a node 43 (destination), for example 13-12-22-32-43 as shown in FIG. 3B, the source arms a timer T1, after the expiration of which the route is flushed and the discovery process occurs again the next time a new path to node 43 is needed. Increasing the value of T1 helps minimize the undesirable effect of flooding probes at the risk of increasing the amount of states in the nodes (number of stored routed) but more importantly thus increasing the probability of using a stale route.

Figure 4:
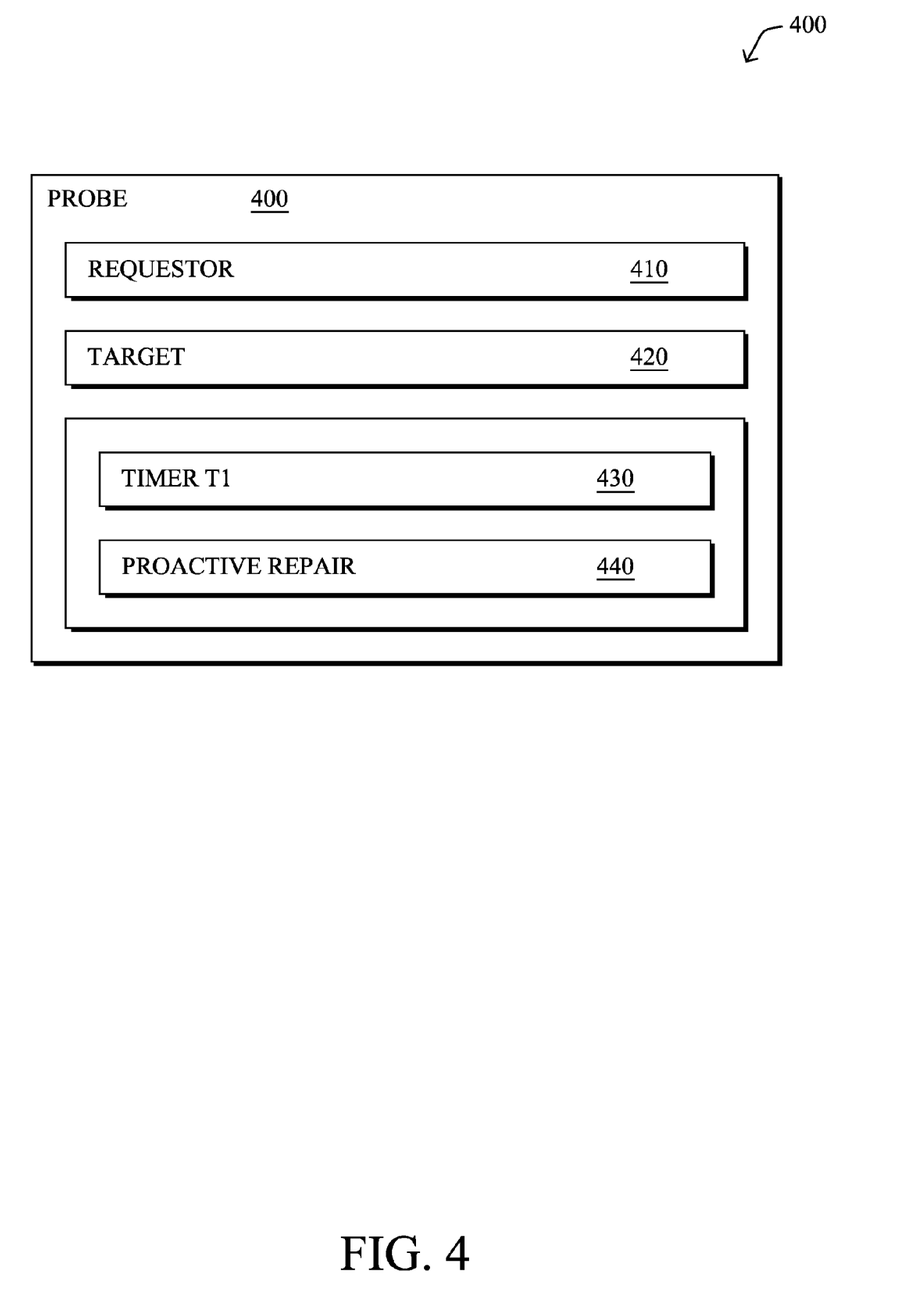
FIG. 4 illustrates an example probe message.
Figure 5:
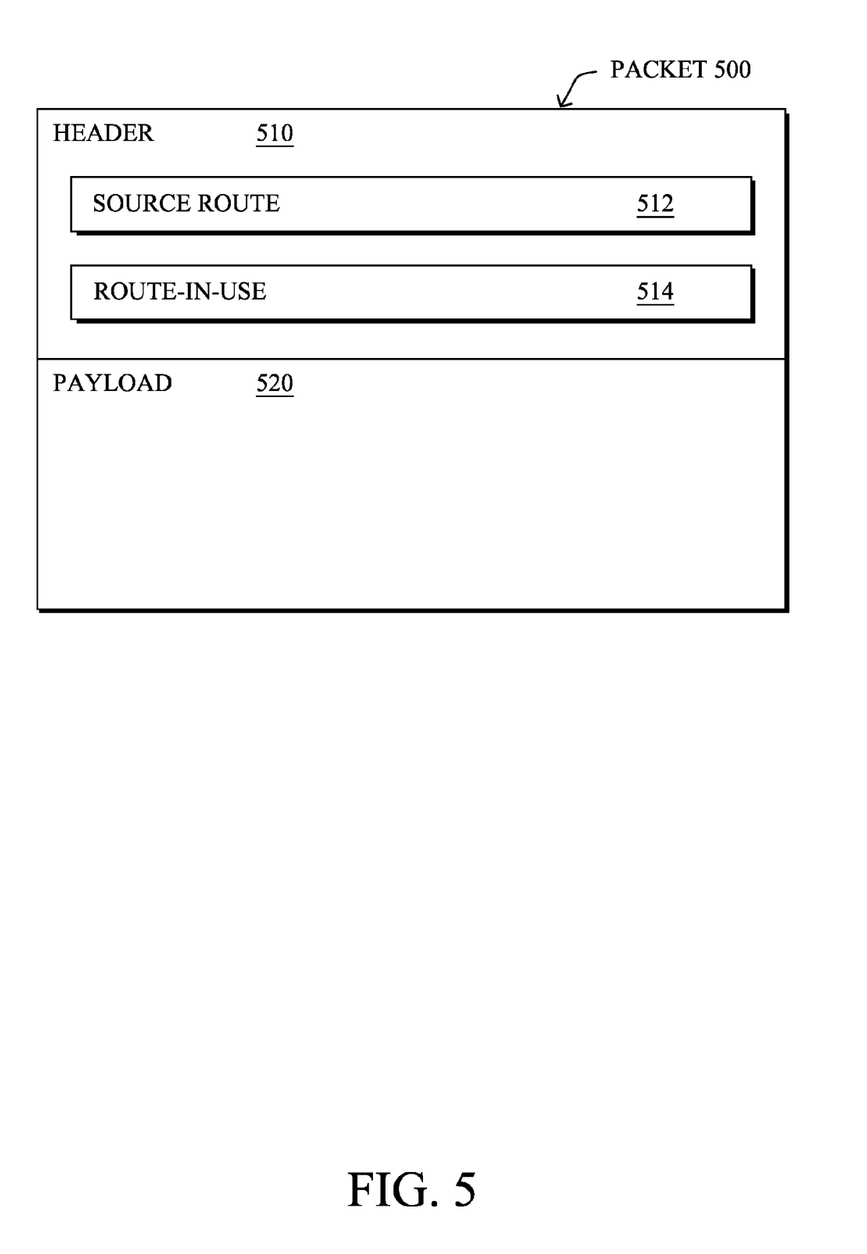
FIG. 5 illustrates an example data packet.

With current approaches, intermediate nodes are not aware of the value of T1. A first aspect of the techniques herein consists of specifying a new TLV carried in the probe 400, as shown in FIG. 4, which generally comprises an identity of the requestor (source) 410 and target (destination) 420. The TLV (or other field) may specify two parameters as described in greater detail below: 1) The timer value T1 430 set by the source (node 13 in our example) and 2) a new flag 440 used to request intermediate nodes to make use of this invention (called the Proactive Repair (PR) bit). In addition, as shown in FIG. 5 and as also described in greater detail below, packets/traffic 500 (e.g., packets 140 above) may comprise within header 510, in addition to the source route 512, a new bit called the Route In Use (RIU) bit 514 that may set in data packets (with payload 520) sent along a source route.

Upon receiving a path discovery probe 400 (also referred to as a route request or "RREQ" in most reactive routing protocols), if the PR bit 440 is set and the route is in use (a route reply has been seen), the intermediate node stores the value of T1 along with the source address of the requestor and the next hop (from which the route reply or "RREP" has been received) if and only if a subsequent data packet 500 with the RIU bit 514 set is received. In particular, this is because a source may find a number of routes, and select one of them, thus the intermediate nodes needs to know thanks to the RIU bit in data packets if the route is effectively in use.

Note that the value of T1 may be decremented as the probe is processed along the route by a value equal to the communication delay experienced at each hop, should the per-hop communication latency be a non-trivial fraction of T1 (for example, if the delay to traverse each link is 0.5 seconds, and T1=300 s, the stored value of T1 on node 32 should be 30.5 s).

Figure 6:
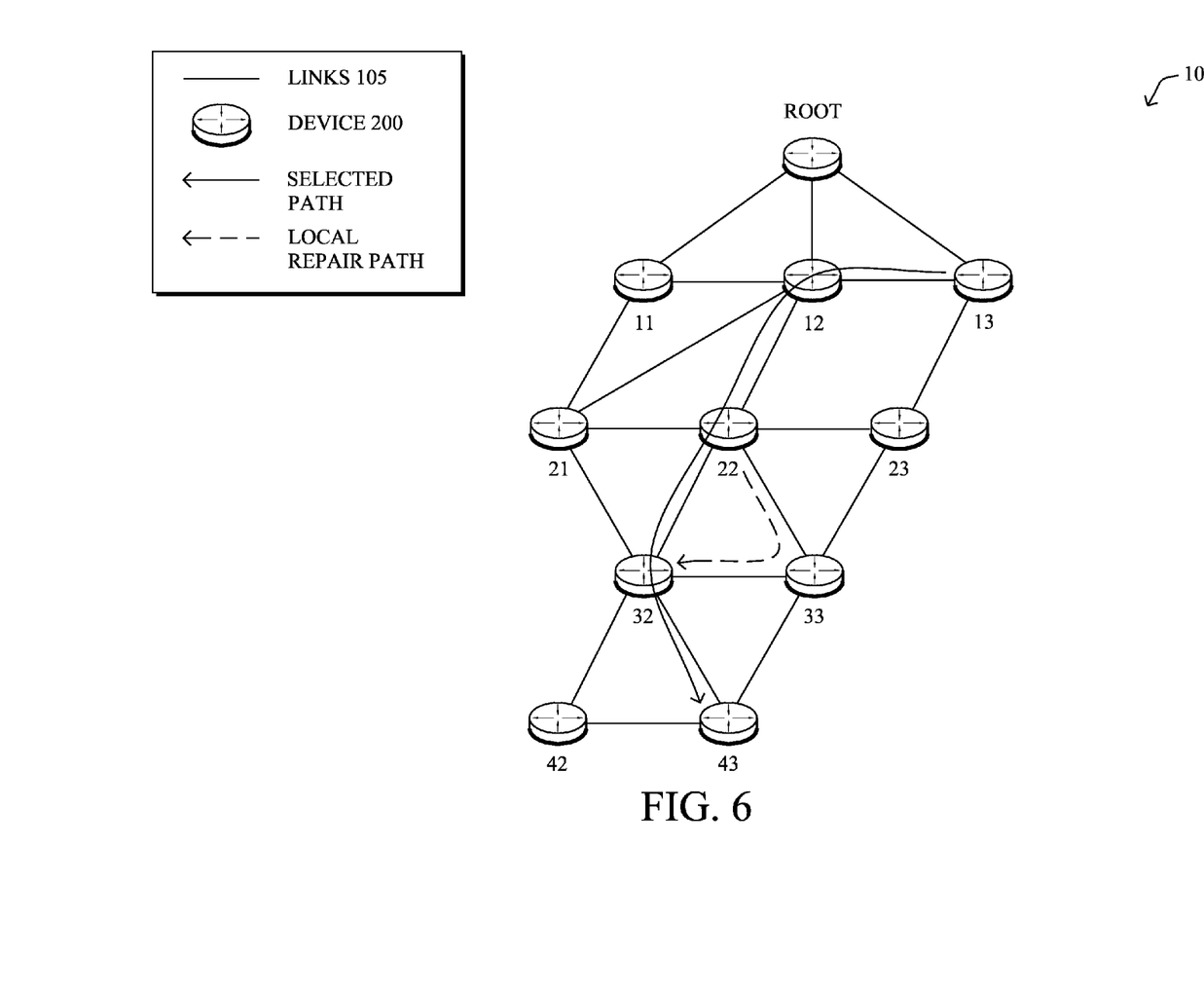
FIG. 6 illustrates an example of local repair.

A second aspect of the embodiments herein involves monitoring the health of the link from the node to its next-hop (e.g., from node 22-32). In general, several techniques can be used, such as active probing, monitoring the received signal strength indication (RSSI), etc. If the node determines that the link fails (or becomes extremely weak) before the expiration of the local time specified by T1, then the intermediate node sends a local probe searching for a path to the next hop. Note that this local probe is not broadcast flooded through the entire network, but maintains a limited search scope. One approach for the local probe is to utilize an expanding ring search, e.g., starting with TTL=2, then TTL=3, etc. Another approach is to make use of a protocol such as Neighborhood Discovery Protocol (NHDP) to find 2-hop routes to a node that was previously 1-hop away. Referring again to the example, if node 22 determines that the link 22-32 is too weak or has failed, it may dynamically compute a local path to 32 with a limited scope search. As shown in FIG. 6, the computed local repair path is 22-33-32.

Once a local repair path is in use, several options are possible:

The intermediate router may inform the source of the new path along with the path cost increase (e.g., a new RREP packet augmented with path_cost_increase value is sent to the source): thus the source may decide to rediscover an entirely new (potentially more optimal) path, potentially after the expiration of a local timer T2 so as to confirm that the failure is not transient.

Alternatively, the intermediate router may not report the path change to the source.

Choosing whether or not to notify the source may be a statically configured option. In another embodiment, the choice may be driven by the amount of change in the path cost, the choice may be driven by some time delay associated with the path cost increase, the amount of traffic utilizing the path, etc.

Upon receiving a data packet, if the next entry is not reachable, the intermediate node replaces the next hop by the local path to the next hop. For example, within the source route 13-12-22-32-43, link 22-32 becomes 22-33-32, thus: 13 12 22 33 32 43.

This approach is beneficial over existing local protection mechanisms for a number of reasons. For instance, local repair paths are computed on-the-fly and only if the route is in use by a source for a period of time T1>T_min (in other words the intermediate nodes only trigger the techniques herein for routes that will be in use for a specific amount of time).

After the expiration of the local timer T1, the local repair path may be flushed.

Note that an intermediate node may decide to send the local probe to find the local path just before detecting a link failure (for example, if RSSI<X, then computing the local path). In this manner, the techniques herein do not merely monitor health, but trigger health monitoring and search for a local path, accordingly.

Note also that in an alternative example, if node 32 fails, and not just the link (22-32), the techniques may be adapted to find an alternate path to the next-next-hop (node 43), such as 22-33-43, bypassing node 32. In particular, the local scope value of the probe is tunable. Thus, with this technique, an intermediate can protect the link, the next hop, and could even compute the local path up to the final destination.

Figure 7A:
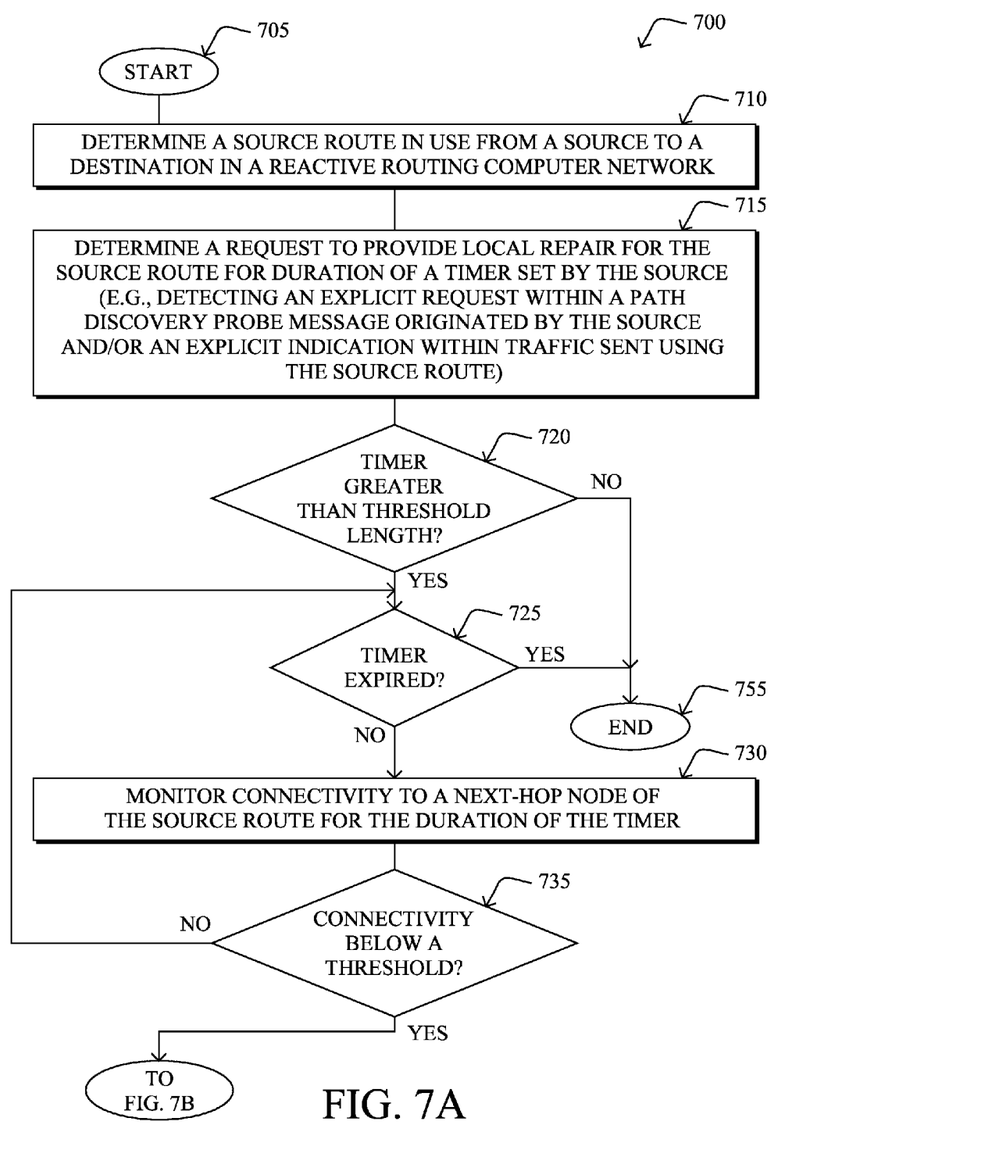
FIGS. 7A-7B illustrate an example simplified procedure for proactive timer-based local repair path communication from the perspective of an intermediate device.
Figure 7B:
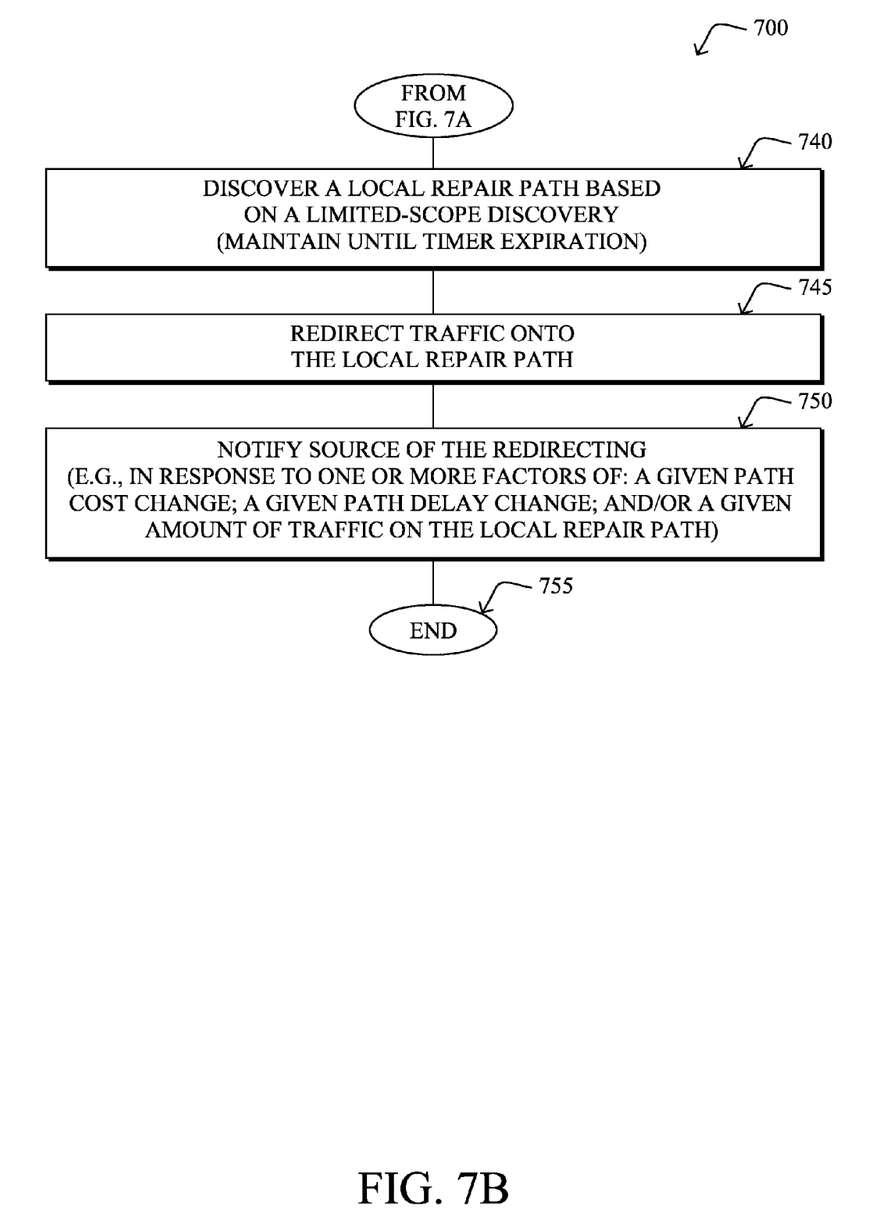

FIGS. 7A-7B illustrate an example simplified procedure 700 for proactive timer-based local repair path communication in a reactive routing communication network in accordance with one or more embodiments described herein, particularly from the perspective of an intermediate device. The procedure 700 may start at step 705, and continues to step 710, where, as described in greater detail above, an intermediate device (e.g., node 22) may determine a source route in use from a source to a destination in a reactive routing computer network. In addition, the intermediate device may determine a request to provide local repair for the source route for duration of a timer set by the source in step 715. For example, as described above, step 715 may comprise detecting an explicit request 440 within a path discovery probe message 400 originated by the source and/or an explicit indication 514 within traffic 500 sent using the source route, etc. In one embodiment, if the timer is not greater than a threshold length in step 720, then the procedure ends in step 755.

Once the request to provide local repair has been determined, then for the duration of the timer in step 725 (e.g., if the timer is greater than a threshold length), the intermediate device may monitor connectivity to a next-hop node (e.g., node 32) of the source route in step 730. If the connectivity is determined to be below a threshold in step 735 prior to expiration of the timer, then in step 740 the intermediate node attempts to discover a local repair path based on a limited-scope discovery. As mentioned above, the local repair path may be maintained until timer expiration. Traffic received at the intermediate node for the source route may then be redirected onto the local repair path in step 745 until expiration of the timer, or until a new path/route is created by the source device. In addition, in one or more embodiments as mentioned above, the intermediate device may decide to notify the source of the redirecting in step 750, such as in response to one or more factors of: a given path cost change; a given path delay change; and/or a given amount of traffic on the local repair path. The procedure 700 illustratively ends in step 755.

Figure 8:
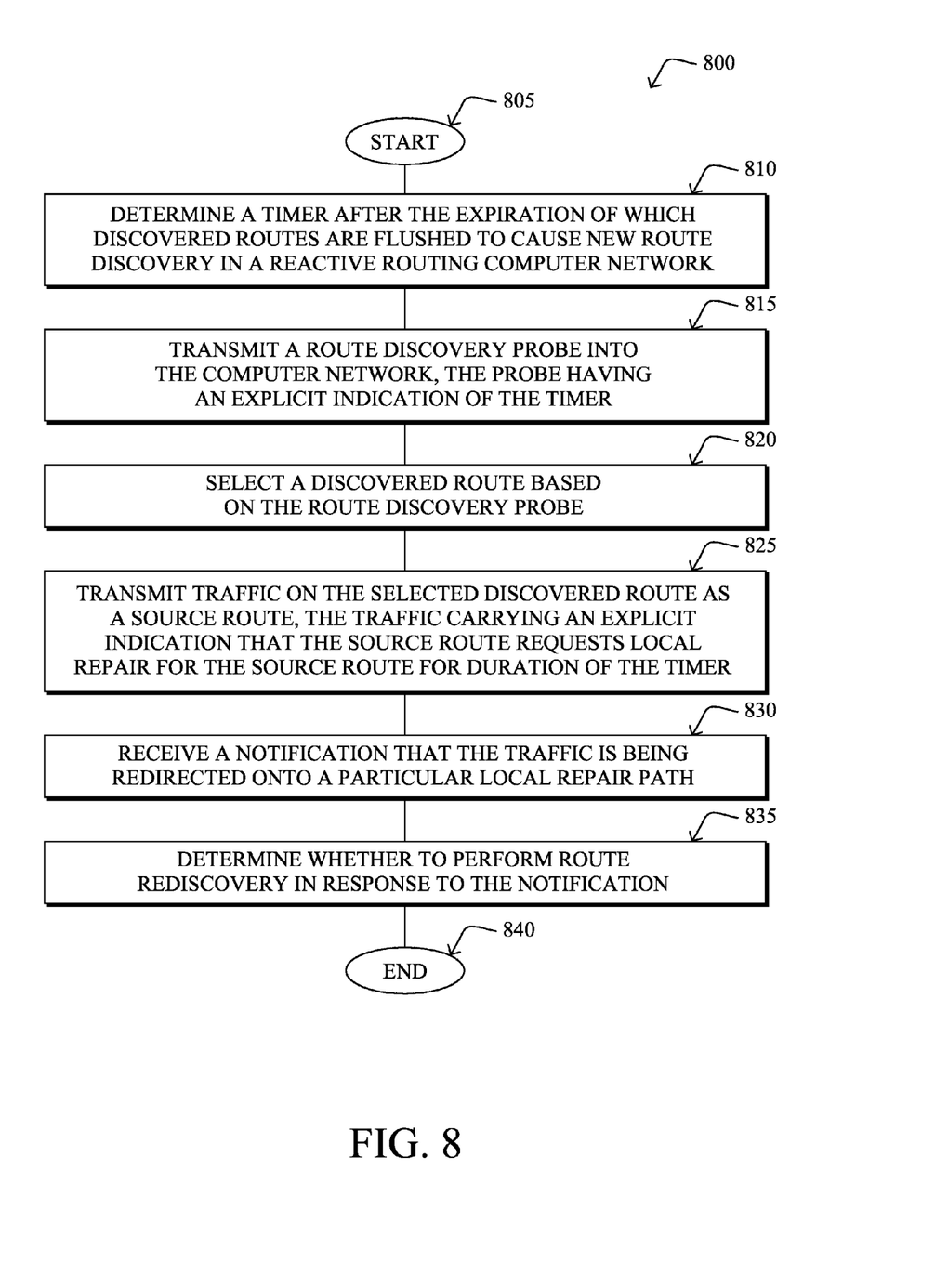
FIG. 8 illustrates an example simplified procedure for proactive timer-based local repair path communication from the perspective of a source device.

In addition, FIG. 8 illustrates an example simplified procedure 800 for proactive timer-based local repair path communication in a reactive routing communication network in accordance with one or more embodiments described herein, particularly from the perspective of a source device. The procedure 800 may start at step 805, and continues to step 810, where, as described in greater detail above, a source device (e.g., node 13) determine a timer after the expiration of which discovered routes are flushed to cause new route discovery in a reactive routing computer network. Accordingly, as described above, the source device may transmit a route discovery probe (e.g., RREQ) 400 into the computer network in step 815, the probe having an explicit indication of the timer 430 (e.g., and the request to provide proactive repair, 440). Once the source device selects a discovered route based on the route discovery probe in step 820, then it may transmit traffic 500 on the selected discovered route in step 825 as a source route 512, where the traffic carries an explicit indication 514 that the source route requests local repair for the source route for duration of the timer. Note that in step 830 the source device may receive a notification that the traffic is being redirected onto a particular local repair path, and if so, then in step 835 may determine whether to perform route rediscovery in response to the notification, as detailed above. The procedure 800 illustratively ends in step 840, having completed sending the traffic, or else having rediscovered a new path in response to timer expiration or notification of path/route failure.

It should be noted that while certain steps within procedures 700-800 may be optional as described above, the steps shown in FIGS. 7A-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein for, therefore, provide for proactive timer-based local repair path communication in a reactive routing communication network. In particular, the techniques herein provide a robust repair mechanism for reactive protocols at intermediate nodes, and significantly reduces the risk of using a stale route in a source routed environment using reactive routing, thus reducing the packet drop probability and time to deliver a data packet but also decreasing the number of flooded probes in the network, one of the major issue with reactive routing.

While there have been shown and described illustrative embodiments of techniques for use with reactive routing in communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by an intermediate node between a source node and a destination node, a source route in use from a source to a destination in a reactive routing computer network;
   receiving, by the intermediate node, a request to provide local repair for the source route for duration of a timer set by the source, wherein the request is originated by the source node and includes the timer and a proactive repair bit;
   storing the timer at the intermediate node;
   discovering, in response to the request, a local repair path based on a limited-scope discovery by the intermediate node;
   maintaining, by the intermediate node, the local repair path for the source route until expiration of the timer; and
   after expiration of the timer, flushing the local repair path at the intermediate node.

2. The method as in claim 1, further comprising:
   monitoring connectivity to a next-hop node of the source route for the duration of the timer; and
   discovering the local repair path in response to the connectivity being below a threshold.

3. The method as in claim 2, further comprising:
   redirecting traffic using the source route onto the local repair path in response to the connectivity being below the threshold.

4. The method as in claim 3, further comprising:
   notifying the source of the redirecting.

5. The method as in claim 4, wherein notifying the source of the redirecting comprises:
   notifying the source of the redirecting only in response to one or more factors selected from a group consisting of: a given path cost change; a given path delay change; and a given amount of traffic on the local repair path.

6. The method as in claim 1, wherein determining the request to provide local repair comprises:
   detecting an explicit request within a path discovery probe message originated by the source.

7. The method as in claim 1, wherein determining the request to provide local repair comprises:
  detecting an explicit indication within traffic sent using the source route.

8. The method as in claim 1, wherein discovering the local repair path comprises:
  discovering the local repair path in further response to the timer being greater than a threshold length.

9. A method, comprising:
  determining, by a source, a timer after the expiration of which discovered routes are flushed at each intermediate node along a path between the source and a destination, to cause new route discovery in a reactive routing computer network;
  transmitting a route discovery probe into the computer network, the probe including a timer to be stored on each intermediate node that receives the probe and a proactive bit indicating that the timer should be stored at each of the intermediate nodes;
  selecting a discovered route based on the route discovery probe; and
  transmitting traffic on the selected discovered route as a source route, the traffic carrying an explicit indication that the source route requests local repair for the source route for duration of the timer.

10. The method as in claim 9, further comprising:
  receiving a notification that the traffic is being redirected onto a particular local repair path; and
  determining whether to perform route rediscovery in response to the notification.

11. An apparatus, comprising:
  one or more network interfaces to communicate within a reactive routing computer network;
  a processor coupled to the network interfaces and adapted to execute one or more processes; and
  a memory configured to store a process executable by the processor, the process when executed operable to:
    determine a source route in use from a source to a destination in a reactive routing computer network;
    receive a request to provide local repair for the source route for duration of a timer set by the source, wherein the request is originated by the source node and includes the timer and a proactive repair bit;
    store the timer;
    discover, in response to the request, a local repair path based on a limited-scope discovery;
    maintain the local repair path for the source route until expiration of the timer; and
    after expiration of the timer, flush the local repair path, wherein the apparatus is an intermediate node between the source and the destination.

12. The apparatus as in claim 11, wherein the process when executed is further operable to:
  monitoring connectivity to a next-hop node of the source route for the duration of the timer; and
  discover the local repair path in response to the connectivity being below a threshold.

13. The apparatus as in claim 12, wherein the process when executed is further operable to:
  redirect traffic using the source route onto the local repair path in response to the connectivity being below the threshold.

14. The apparatus as in claim 13, wherein the process when executed is further operable to:
  notify the source of the redirecting.

15. The apparatus as in claim 14, wherein the process when executed to notify the source of the redirecting is further operable to:
  notify the source of the redirecting only in response to one or more factors selected from a group consisting of: a given path cost change; a given path delay change; and a given amount of traffic on the local repair path.

16. The apparatus as in claim 11, wherein the process when executed to determine the request to provide local repair is further operable to:
  detect an explicit request within a path discovery probe message originated by the source.

17. The apparatus as in claim 11, wherein the process when executed to determine the request to provide local repair is further operable to:
  detect an explicit indication within traffic sent using the source route.

18. The apparatus as in claim 11, wherein the process when executed to discover the local repair path is further operable to:
  discover the local repair path in further response to the timer being greater than a threshold length.

19. An apparatus, comprising:
  one or more network interfaces to communicate within a reactive routing computer network;
  a processor coupled to the network interfaces and adapted to execute one or more processes; and
  a memory configured to store a process executable by the processor, the process when executed operable to:
    determine, as a source, a timer after the expiration of which discovered routes are flushed at each intermediate node along a path between the source and a destination, to cause new route discovery in a reactive routing computer network;
    transmit a route discovery probe into the computer network, the probe including a timer to be stored on each intermediate node that receives the probe and a proactive bit indicating that the timer should be stored at each of the intermediate nodes;
    select a discovered route based on the route discovery probe; and
    transmit traffic on the selected discovered route as a source route, the traffic carrying an explicit indication that the source route requests local repair for the source route for duration of the timer.

20. The apparatus as in claim 19, wherein the process when executed is further operable to:
  receive a notification that the traffic is being redirected onto a particular local repair path; and
  determine whether to perform route rediscovery in response to the notification.

* * * * *